US009752949B2

(12) United States Patent
Bizub et al.

(10) Patent No.: US 9,752,949 B2
(45) Date of Patent: Sep. 5, 2017

(54) SYSTEM AND METHOD FOR LOCATING ENGINE NOISE

(71) Applicant: GENERAL ELECTRIC COMPANY, Schenectady, NY (US)

(72) Inventors: Jeffrey Jacob Bizub, Milwaukee, WI (US); Mark James Lemke, Sun Prairie, WI (US)

(73) Assignee: GENERAL ELECTRIC COMPANY, Schenetady, NY (US)

( * ) Notice: Subject to any disclaimer, the term of this patent is extended or adjusted under 35 U.S.C. 154(b) by 303 days.

(21) Appl. No.: 14/587,434

(22) Filed: Dec. 31, 2014

(65) Prior Publication Data

US 2016/0187220 A1 Jun. 30, 2016

(51) Int. Cl.
*G01L 23/22* (2006.01)
*F02D 41/22* (2006.01)
*F02D 35/02* (2006.01)

(52) U.S. Cl.
CPC .......... *G01L 23/221* (2013.01); *F02D 35/027* (2013.01); *F02D 41/22* (2013.01); *G01L 23/227* (2013.01); *F02D 2041/228* (2013.01); *F02D 2200/021* (2013.01); *F02D 2200/025* (2013.01); *Y02T 10/40* (2013.01)

(58) Field of Classification Search
CPC ..... G01L 23/221; G01L 23/22; G01L 23/226; G01L 23/227; F02D 41/22; F02D 35/027; G01M 15/12
See application file for complete search history.

(56) References Cited

U.S. PATENT DOCUMENTS

| 4,444,042 A * | 4/1984 | Bonitz ................. G01L 23/225 73/35.03 |
| 5,029,565 A | 7/1991 | Talbot |
| 5,111,790 A | 5/1992 | Grandy |
| 5,115,778 A | 5/1992 | Holroyd |
| 5,119,783 A | 6/1992 | Komurasaki |
| 5,241,480 A | 8/1993 | Takaku et al. |

(Continued)

FOREIGN PATENT DOCUMENTS

| CN | 203480037 | 3/2014 |
| DE | 102004036502 A1 | 4/2006 |

(Continued)

OTHER PUBLICATIONS

Vulli et al., "Time-frequency analysis of single-point engine-block vibration measurements for multiple excitation-event identification", Journal of Sound and Vibration, vol. No. 321, Issue No. 3-5, pp. 1129-1143, Apr. 10, 2009.

(Continued)

*Primary Examiner* — Paul West
*Assistant Examiner* — Xin Zhong
(74) *Attorney, Agent, or Firm* — Fletcher Yoder, P.C.

(57) ABSTRACT

A system includes a controller configured to receive noise signals acquired by at least two knock sensors of a plurality of knock sensors coupled to a reciprocating device. Each noise signal represents a noise signature of the reciprocating device detected at a respective knock sensor. The controller is also configured to determine a location of a coincident noise within the reciprocating device based at least on the received noise signals.

20 Claims, 5 Drawing Sheets

(56) References Cited

U.S. PATENT DOCUMENTS

| | | |
|---|---|---|
| 5,257,533 A | 11/1993 | Inada |
| 5,337,240 A | 8/1994 | Nakagawa et al. |
| 5,339,245 A | 8/1994 | Hirata et al. |
| 5,361,213 A | 11/1994 | Fujieda et al. |
| 5,392,642 A | 2/1995 | Tao |
| 5,400,648 A | 3/1995 | Mahr |
| 5,452,699 A | 9/1995 | Rossignol |
| 5,467,638 A | 11/1995 | Philipp |
| 5,594,649 A | 1/1997 | Cook et al. |
| 5,693,936 A | 12/1997 | Komachiya et al. |
| 5,763,769 A | 6/1998 | Kluzner |
| 5,837,887 A | 11/1998 | Shibata et al. |
| 5,905,193 A | 5/1999 | Hashizume et al. |
| 5,932,801 A | 8/1999 | Akishita et al. |
| 5,934,256 A | 8/1999 | Wenzlawski et al. |
| 5,996,398 A | 12/1999 | Schleupen et al. |
| 6,104,195 A | 8/2000 | Yoshinaga et al. |
| 6,273,064 B1 | 8/2001 | Scholl et al. |
| 6,276,334 B1 | 8/2001 | Flynn et al. |
| 6,330,877 B1 | 12/2001 | Nordin |
| 6,336,355 B1 | 1/2002 | Sasaki et al. |
| 6,550,311 B2 | 4/2003 | Sloboda |
| 6,598,468 B2 | 7/2003 | Zur Loye et al. |
| 6,662,781 B1 | 12/2003 | Torno et al. |
| 6,814,054 B2 | 11/2004 | Sauler et al. |
| 6,862,517 B2 | 3/2005 | Galtier |
| 6,885,932 B2 | 4/2005 | Liu et al. |
| 6,912,460 B2 | 6/2005 | Sauler et al. |
| 6,947,829 B2 | 9/2005 | Honda |
| 6,978,771 B2 | 12/2005 | Kuzuyama et al. |
| 6,990,947 B2 | 1/2006 | Kuzuyama et al. |
| 7,021,128 B2 | 4/2006 | Rauchfuss et al. |
| 7,027,909 B2 | 4/2006 | deBotton et al. |
| 7,181,338 B2 | 2/2007 | Takemura et al. |
| 7,191,658 B2 | 3/2007 | Oda et al. |
| 7,212,909 B2 | 5/2007 | Yoshino et |
| 7,243,529 B2 | 7/2007 | Takemura et al. |
| 7,246,600 B2 | 7/2007 | Nakashima et al. |
| 7,260,469 B2 | 8/2007 | Birk et al. |
| 7,263,872 B2 | 9/2007 | Danet et al. |
| 7,310,993 B2 | 12/2007 | Popielas et al. |
| 7,325,529 B2 | 2/2008 | Ancimer et al. |
| 7,356,404 B2 | 4/2008 | Takemura et al. |
| 7,376,506 B2 | 5/2008 | Schueler |
| 7,383,816 B2 | 6/2008 | Zurlo |
| 7,444,231 B2 | 10/2008 | Ancimer et al. |
| 7,444,236 B2 | 10/2008 | Wiles |
| 7,448,254 B2 | 11/2008 | Kurtz et al. |
| 7,546,198 B2 | 6/2009 | Remelman |
| 7,559,230 B2 | 7/2009 | Zimmer |
| 7,571,640 B2 | 8/2009 | Andrews |
| 7,628,253 B2 | 12/2009 | Jin et al. |
| 7,669,582 B2 | 3/2010 | Kaneko et al. |
| 7,712,450 B2 | 5/2010 | Sato et al. |
| 7,747,380 B2 | 6/2010 | Chauvin et al. |
| 7,810,469 B2 | 10/2010 | Vigild et al. |
| 7,823,561 B2 | 11/2010 | Omuro et al. |
| 8,000,884 B2 | 8/2011 | Aso et al. |
| 8,032,293 B2 | 10/2011 | Binder et al. |
| 8,068,972 B2 | 11/2011 | Auclair et al. |
| 8,078,389 B2 | 12/2011 | Huang et al. |
| 8,079,261 B2 | 12/2011 | Crickmore et al. |
| 8,108,131 B2 | 1/2012 | Huang et al. |
| 8,155,857 B2 | 4/2012 | Loeffler et al. |
| 8,250,905 B2 | 8/2012 | Schneider et al. |
| 8,260,531 B2 | 9/2012 | Yasuda |
| 8,316,824 B2 | 11/2012 | Hagari et al. |
| 8,342,011 B2 | 1/2013 | Galtier et al. |
| 8,359,909 B2 | 1/2013 | Duval et al. |
| 8,396,649 B2 | 3/2013 | Huang |
| 8,463,533 B2 | 6/2013 | Glugla et al. |
| 8,499,623 B2 | 8/2013 | Duval et al. |
| 8,528,521 B2 | 9/2013 | Landsmann et al. |
| 8,538,666 B2 | 9/2013 | Buslepp et al. |
| 8,606,484 B2 | 12/2013 | Ohata |
| 8,627,800 B2 | 1/2014 | Glugla et al. |
| 8,639,432 B2 | 1/2014 | Matsuo et al. |
| 8,677,975 B2 | 3/2014 | Auclair et al. |
| 8,680,707 B2 | 3/2014 | Childs et al. |
| 8,682,347 B2 | 3/2014 | Hepo-Oja |
| 8,810,286 B1 | 8/2014 | Muhammad et al. |
| 8,849,471 B2 | 9/2014 | Daniel et al. |
| 2002/0050162 A1* | 5/2002 | Castagne ............ G01L 23/221 73/35.12 |
| 2005/0086999 A1 | 4/2005 | Subramanian et al. |
| 2007/0277780 A1 | 12/2007 | Akazaki et al. |
| 2008/0053405 A1 | 3/2008 | Vigild et al. |
| 2008/0133177 A1 | 6/2008 | Klenk et al. |
| 2008/0190271 A1* | 8/2008 | Taub ................. G10H 1/0058 84/645 |
| 2009/0048729 A1 | 2/2009 | Waters et al. |
| 2010/0326170 A1 | 12/2010 | Schneider et al. |
| 2012/0022762 A1 | 1/2012 | Rosero |
| 2012/0047997 A1 | 3/2012 | Esteghlal et al. |
| 2012/0053818 A1 | 3/2012 | Sackmann et al. |
| 2012/0266844 A1 | 10/2012 | Hagari et al. |
| 2013/0006505 A1 | 1/2013 | Shinagawa et al. |
| 2013/0047956 A1 | 2/2013 | Davis |
| 2013/0060447 A1 | 3/2013 | Guerrassi et al. |
| 2013/0096809 A1 | 4/2013 | Haeming et al. |
| 2013/0125633 A1 | 5/2013 | Mair et al. |

FOREIGN PATENT DOCUMENTS

| | | |
|---|---|---|
| DE | 102006008802 A1 | 8/2007 |
| DE | 102012021053 A1 | 4/2014 |
| EP | 273601 | 2/1987 |
| EP | 709662 | 1/1996 |
| EP | 801294 | 10/1997 |
| EP | 889309 | 7/1999 |
| EP | 1202036 A1 | 5/2002 |
| EP | 1447654 | 8/2004 |
| EP | 1698775 | 6/2006 |
| EP | 1840360 | 3/2007 |
| EP | 1840361 A1 | 10/2007 |
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| WO | WO9738292 | 10/1997 |
| WO | WO2004016924 | 2/2004 |
| WO | WO2008000568 | 1/2008 |
| WO | WO2008059376 | 5/2008 |
| WO | WO2009106557 | 9/2009 |
| WO | WO2013015372 | 1/2013 |
| WO | WO2013026950 | 2/2013 |
| WO | WO2013118151 | 8/2013 |

OTHER PUBLICATIONS

Eltaher, "Localization of Engine Knock Events in Combustion Chambers Based on Mathematical-Physical Model of Motor Structure and Pressure Wave Propagation", Alexandria Journal of Physics, vol. No. 3, Issue No. 1, 2013.

European Search Report and Opinion issued in connection with corresponding EP Application No. 15200682.1 on May 31, 2016.

Reduction Piston Slap Excitation by Optimizing Piston Profiles; Takayuki Koizumi et al,; Proc. of 2002 IMAC-XX: Conf. & Exposition on Structural Dynamics, Jun. 12-15, 2000.

VE Piston Dynamics; FEV Group, Inc.; available online; www.fev.com/what-we-do/software/virtual-engine-powertrain-dynamics-simulation/piston-dynamics-module; Jan. 1, 2015.

Diagnostic Internal Combustion Engine Based on Crankshaft Angular Acceleration; Binh Le Khac, Tuma J.; available online; www.researchgate.net, May 2012.

Bolt loosening detection using vibration characteristics of thin plate with piezoelectric elements;Takeshi Nakahara et al; Proc.of SPIE 5391, Smart Struc. & Materials, Jul. 2004.

U.S. Appl. No. 14/676,733, filed Apr. 1, 2015, Jeffrey Jacob Bizub.

U.S. Appl. No. 14/686,350, filed Apr. 14, 2015, Maruthi Narasinga Rao Devarakonda.

(56) References Cited

OTHER PUBLICATIONS

U.S. Appl. No. 14/695,335, filed Apr. 24, 2015, Jeffrey Jacob Bizub.
U.S. Appl. No. 14/705,081, filed May 6, 2015, Scott K. Mann.
U.S. Appl. No. 14/745,986, filed Jun. 22, 2015, Sandro Rivellini.
U.S. Appl. No. 14/754,128, filed Jun. 29, 2015, Jeffrey Jacob Bizub.
U.S. Appl. No. 14/790,785, filed Jul. 2, 2015, Pavan Chakravarthy Nandigama.
U.S. Appl. No. 14/796,934, filed Jul. 10, 2015, Jeffrey Jacob Bizub.
U.S. Appl. No. 14/820,156, filed Aug. 6, 2015, Jeffrey Jacob Bizub.
U.S. Appl. No. 14/918,013, filed Oct. 20, 2015, Venkatesh Raman.
U.S. Appl. No. 14/320,101, filed Jun. 30, 2014, Ryan Thomas Smith.
U.S. Appl. No. 14/587,407, filed Dec. 31, 2014, Jeffrey Jacob Bizub.
U.S. Appl. No. 14/587,412, filed Dec. 31, 2014, Jerry Jacob Bizub.
U.S. Appl. No. 14/577,412, filed Dec. 31, 2014, Jeffrey Jacob Bizub.
U.S. Appl. No. 14/587,434, filed Dec. 31, 2014, Jeffrey Jacob Bizub.
U.S. Appl. No. 14/591,192, filed Jan. 7, 2015, Jeffrey Jacob Bizub.
U.S. Appl. No. 14/592,547, filed Jan. 8, 2015, Jeffrey Jacob Bizub.
U.S. Appl. No. 14/600,674, filed Jan. 20, 2015, Scott K. Mann.
U.S. Appl. No. 14/609,416, filed Jan. 29, 2015, Jeffrey Jacob Bizub.
U.S. Appl. No. 14/614,237, filed Feb. 4, 2015, Pin Zeng.
U.S. Appl. No. 14/617,458, filed Feb. 9, 2015, Jeffrey Jacob Bizub.
U.S. Appl. No. 14/621,028, filed Feb. 15, 2015, Jeffrey Jacob Bizub.
U.S. Appl. No. 14/625,585, filed Feb. 19, 2015, Jeffrey Jacob Bizub.
U.S. Appl. No. 14/626,385, filed Feb. 19, 2015, Jeffrey Jacob Bizub.
U.S. Appl. No. 14/639,736, filed Mar. 5, 2015, Jeffrey Jacob Bizub.
U.S. Appl. No. 14/644,526, filed Mar. 11, 2015, Jeffrey Jacob Bizub.
Hopfinger, J., et al.; "Acoustic Triangulation Device", University of Central Florida; eecs.ucf.edu/seniordesign/fa2009sp2010/g13/files/atd%20newupdate.pdf; 2010 web paper, 95 pages.

* cited by examiner

SYSTEM AND METHOD FOR LOCATING ENGINE NOISE

BACKGROUND

The subject matter disclosed herein relates to knock sensors, and more specifically, to knock sensors mounted to large, multi-cylinder reciprocating devices for component condition detection.

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or more valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load. For example, the load may be a generator that produces electric power. During use, combustion engines may experience various noises, mechanical faults, or changes in conditions that may be difficult to detect (e.g., location) and/or predict.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a controller configured to receive noise signals acquired by at least two knock sensors of a plurality of knock sensors coupled to a reciprocating device. Each noise signal represents a noise signature of the reciprocating device detected at a respective knock sensor. The controller is also configured to determine a location of a coincident noise within the reciprocating device based at least on the received noise signals.

In accordance with a second embodiment, a method of locating a coincident noise within a reciprocating device is provided. The method includes utilizing a reciprocating device controller for receiving noise signals from a plurality of knock sensors, wherein each noise signal represents a noise signature of the reciprocating device detected at a respective knock sensor. The method also includes utilizing the reciprocating device controller for analyzing the noise signals to detect the coincident noise within the reciprocating device. The method further includes utilizing the reciprocating device controller for determining a location of the coincident noise within the reciprocating device based at least on the received noise signals from at least two knock sensors of the plurality of knock sensors.

In accordance with a third embodiment, a method of detecting a coincident noise within a combustion engine is provided. The method includes utilizing an engine controller for receiving noise signals from a plurality of knock sensors, wherein each noise signal represents a noise signature of the combustion engine detected at a respective knock sensor. The method also includes utilizing the engine controller for comparing the received noise signals from different knock sensors of the plurality of knock sensors for matching noise signatures to detect the coincident noise and to identify which knock sensors of the plurality of knock sensors detected the coincident noise.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

During use, combustion engines (or other reciprocating devices or machinery such as compressors) may experience various noises due to mechanical faults or changes in conditions that may be difficult to detect (e.g., location) and/or predict. Knock sensors may be utilized to monitor a combustion engine. Occasionally, the knock sensor system records a noise, such as an abnormal or undesired noise. Rather than ignore and discard the unidentifiable noises, it may be advantageous to determine whether a noise is coincident (i.e., detected by more than one knock sensor). It may also be advantageous to determine the location of the coincident noise. By locating the noise source of the coincident noise, a better diagnosis of the exact source and potential cause of the noise (e.g., mechanical failure and/or change in condition) may be determined. Also, locating the noise source may provide better advanced prognostics.

As described in further detail below, systems and method are provided for identifying and locating coincident noises within a reciprocating device (e.g., combustion engine, compressor such as reciprocating compressor, etc.) utilizing knock sensors. In certain embodiments, the described techniques may also be utilized in turbine engines. The techniques may utilize sound triangulation (e.g., two-dimensional (2D) or three-dimensional (3D) sound triangulation) to locate the coincident noises, as described in more detail below.

Figure 1:
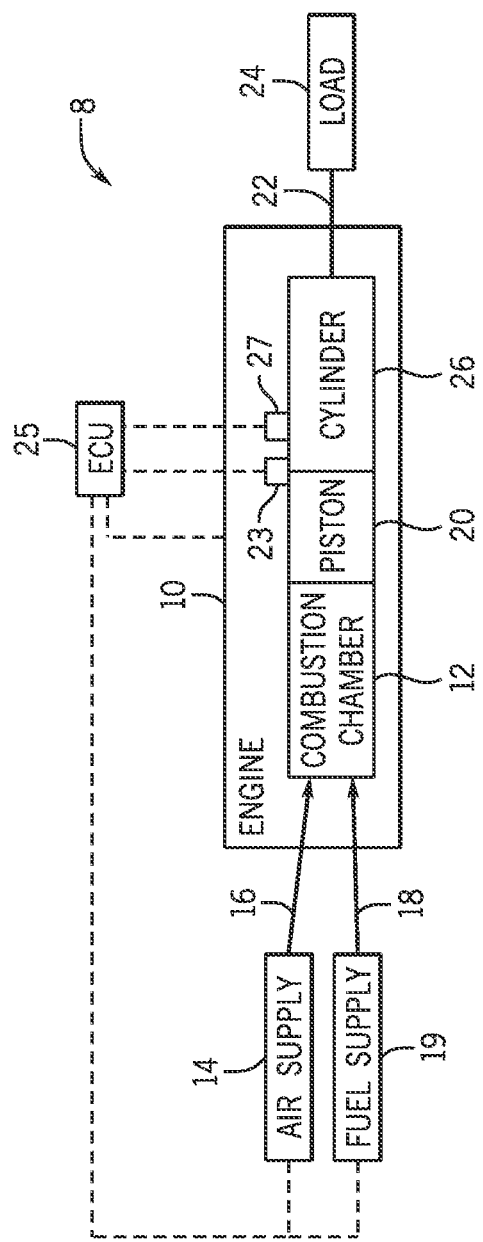
FIG. 1 is a block diagram of an embodiment of a portion of an engine driven power generation system in accordance with aspects of the present disclosure.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The engine driven power generation system 8 may include one or more knock sensors 23 suitable for detecting engine "knock." The knock sensor 23 may sense vibrations caused by the engine, such as vibration due to detonation, pre-ignition, and or pinging. In addition, the engine driven power generation system may include other sensors 27 (e.g., one or more temperature transducers) to detect other operating conditions (e.g., temperature (e.g., global temperature and/or temperature gradient) of a medium (e.g., cast iron) that the one or more knock sensors 23 are coupled to). The knock sensor 23 is shown communicatively coupled to an engine control unit (ECU) 25. During operations, signals from the knock sensor 23 are communicated to the ECU 25 to determine if knocking conditions (e.g., pinging) exist. The ECU 25 may then adjust certain engine 10 parameters to ameliorate or eliminate the knocking conditions. For example, the ECU 25 may adjust ignition timing and/or adjust boost pressure to eliminate the knocking. As further described herein, the knock sensor 23 may additionally derive that certain vibrations (e.g., coincident noises) should be further analyzed and categorized to detect and locate, for example, undesired engine conditions. Although the following techniques detecting and location coincident noises are discussed in terms of a combustion engine, the same techniques may be applied to other reciprocating devices such as compressors.

Figure 2:
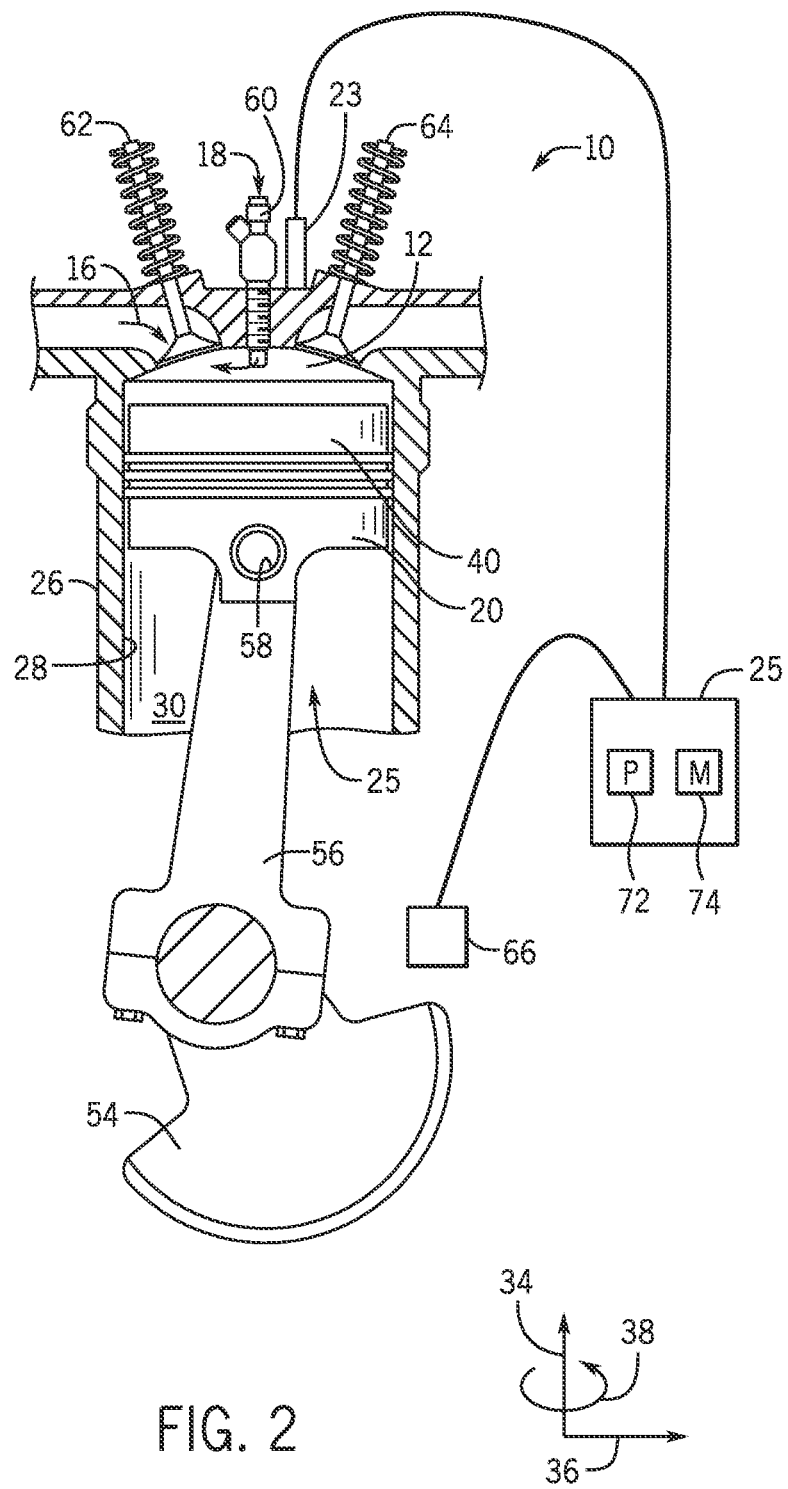
FIG. 2 is a side cross-sectional view of an embodiment of a piston assembly within a cylinder of the reciprocating engine shown in FIG. 1 in accordance with aspects of the present disclosure.

FIG. 2 is a side cross-sectional view of an embodiment of a piston assembly 25 having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of air 16 to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

During engine 10 operations, a sequence including an intake process, a compression process, a power process, and an exhaust process typically occurs. The intake process enables a combustible mixture, such as fuel and air, to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then forces the piston 20 to BDC. The exhaust process typically returns the piston 20 to TDC while keeping the exhaust valve 64 open. The exhaust process thus expels the spent fuel-air mixture through the exhaust valve 64. It is to be noted that more than one intake valve 62 and exhaust valve 64 may be used per cylinder 26.

The depicted engine 10 also includes a crankshaft sensor 66, the knock sensor 23, and the engine control unit (ECU) 25, which includes a processor 72 and memory 74. The crankshaft sensor 66 senses the position and/or rotational speed of the crankshaft 54. Accordingly, a crank angle or crank timing information may be derived. That is, when monitoring combustion engines, timing is frequently expressed in terms of crankshaft 54 angle. For example, a full cycle of a four stroke engine 10 may be measured as a 720° cycle. The knock sensor 23 may be a Piezo-electric accelerometer, a microelectromechanical system (MEMS) sensor, a Hall effect sensor, a magnetorestrictive sensor, and/or any other sensor designed to sense vibration, acceleration, sound, and/or movement. In other embodiments, sensor 23 may not be a knock sensor, but any sensor that may sense vibration, pressure, acceleration, deflection, or movement.

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder 26 may include one or more knock sensors 23 (e.g., one or more arrays of knock sensors 23 arranged along one or more planes through the engine 10). The crankshaft sensor 66 and the knock sensor 23 are shown in electronic communication with the engine control unit (ECU) 25. The ECU 25 includes the processor 72 and the memory 74 (e.g., a machine-readable medium). The memory 74 may store non-transitory code or computer instructions that may be executed by the processor 72. The ECU 25 monitors and controls and operation of the engine 10, for example, by adjusting combustion timing, valve 62, 64, timing, adjusting the delivery of fuel and oxidant (e.g., air), and so on.

Advantageously, the techniques described herein may use the ECU 25 to receive, acquire, or sample data (e.g., noise signals) from the one or more crankshaft sensors 66 and/or the one or more knock sensors 23. In order to detect and/or locate any coincident noises within the engine 10, data from the sensors (e.g., knock sensors and/or crankshaft sensors 66) may be sampled at both the same rate and taken at the same time. In certain embodiments, the noise signals utilized to detect and/or locate coincident noises may be received solely from the one or more knock sensors 23. In other embodiments, the noise signals may be utilized to detect and/or locate coincident noises may be received from both the crankshaft sensor 66 and the knock sensors 23. Each noise signal represents a noise signature of the engine 10 detected at a respective knock sensor 23. In certain embodiments, the ECU 25 creates a "noise" signature by plotting the knock sensor 23 data against the crankshaft 54 position. The ECU 25 may then go through the process of analyzing the data to derive normal (e.g., known and expected noises) and/or abnormal signatures (e.g., unknown or unexpected noises). The ECU 25 may then characterize the abnormal signatures (e.g., detect and/or locate coincident noises), as described in more detail below. By providing for signature analysis, the techniques described herein may enable more optimal and more efficient operations and maintenance of the engine 10.

Figure 3:
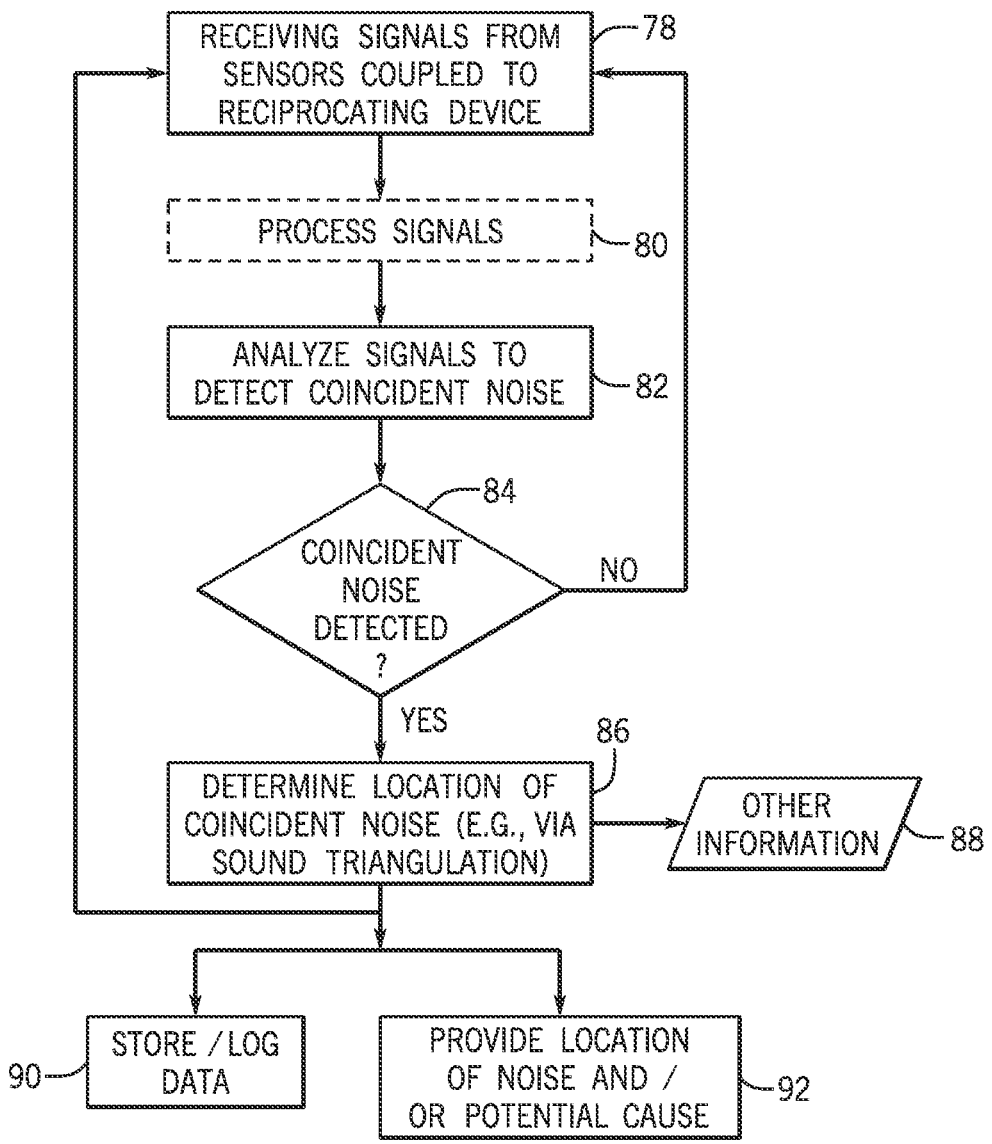
FIG. 3 is a flow chart illustrating an embodiment of a process for analyzing signals for detecting and locating coincident noises in a reciprocating device in accordance with aspects of the present disclosure.

FIG. 3 is a flow chart illustrating an embodiment of a process 76 for analyzing signals for detecting and locating coincident noises in a reciprocating device (e.g., the engine 10 in FIG. 2, compressor, etc.). The process 76 may be implemented as computer instructions or executable code stored in the memory 74 and executable by the processor 72 of the ECU 25 or any reciprocating device controller. The process 76 includes receiving, sampling, or acquiring signals (e.g., noise signals) or data from sensors coupled to the reciprocating device (block 78). The sensors may include the knock sensors 23 and/or the crankshaft sensors 66. The sensors may be sampled at a same rate and taken at a same time. The noise signals may include a noise signature of the reciprocating device (e.g., engine 10) detected at a respective knock sensor 23. In certain embodiments, the noise signals may be acquired from knock sensors 23 arrayed along a single plane (see FIG. 5) or multiple planes (see FIG. 6). In certain embodiments, the sensors may include one or more temperature sensors or transducers that detect a temperature of a medium (e.g., cast iron or other material or combination of materials) that the knock sensors 23 are coupled to on the reciprocating device. Thus, the one or more temperature sensors may provide a temperature signal that represents the temperature of the medium, such as a global temperature or a temperature gradient at the location each knock sensor 23 is coupled to the medium. In certain embodiments, the process 76 includes processing the received signals (e.g., noise signals) or data (block 80). Processing may include pre-conditioning the signals prior to analysis. For example, the raw knock sensor (e.g., engine noise) data for a respective knock sensor 23 may be plotted against a crankshaft position. In addition, the raw data may be scaled (e.g., by determining a multiplier that would result in a maximum amplitude of positive 1 and applying the multiplier to the raw data).

The process 76 further includes analyzing the signals (e.g., noise signals) to detect coincident noise (block 82). For example, the noise signatures of the signals (e.g., noise signals) acquired from different knock sensors 23 may be compared to look for matching noise signatures. A number of techniques may be utilized for detecting the coincident noise. For example, joint time frequency analysis may be applied to the noise signals in identifying coincident noise. For example, the joint time-frequency techniques may include cepstrum techniques, quefrency techniques, chirplet techniques, and/or wavelet techniques to develop an acoustic model or fingerprint of the unknown noise that may be compared between the noise signals for a match.

Also, an attack, decay, sustain, release (ADSR) envelope may be applied to the noise signals (e.g., raw engine noise plot or scaled engine noise plot). The ADSR envelope is typically used in music synthesizers in order to mimic the sound of musical instruments. Applying the ADSR envelope to knock sensor 23 data may enable noise analysis more quickly and efficiently. The four principle parameters of the ADSR envelope are attack, decay, sustain, and release. The attack occurs from the start of the noise to a peak amplitude of a scaled curve. The decay occurs from in the run down from the peak amplitude to a designated sustain level, which may be some specified percent of the maximum amplitude. It should be understood that the order of the four parameters does not have to be attack, decay, sustain, and release. For example, for some noises, the order may be attack, sustain, decay, and release. In such cases, an ASDR, rather than ADSR, envelope would be applied. For the sake of simplicity, this will be referred to as an "ADSR envelope," but it should be understood that the term applies to a noise regardless of the order of the parameters. The sustain level is the main level during the noise's duration. Applying the ADSR envelope may enable certain tones to be extracted from the noise signals that may be compared between the noise signals for a match.

The process 76 includes determining whether a coincident noise was detected by the sensors (e.g., knock sensors 23) (block 84). If no coincident noise is detected, the process 76 continues with receiving and analyzing signals from the sensors (blocks 78, 82). If a coincident noise is detected, the process 76 proceeds with determining a location of the coincident noise (block 86). In certain embodiments, determining the location of the coincident noise involves selecting at least a couple of noise signals from those knock sensors 23 that detected the coincident noise for utilization in locating the coincident noise. In other embodiments, the noise signals from all of the knock sensors 23 that detected the coincident noise may be utilized. Acoustic source localization (e.g., sound triangulation) may be utilized to determine the location of the coincident noise in the reciprocating device. Based on the known location of the knock sensors that detected the coincident noise and given that the knock sensors are sampled at the same rate and taking data at the same time, the source of the detected coincident sound may be detected. Besides the location of the knock sensors 23 and the sampling rate of the knock sensors 23, other information 88 may also be utilized in locating the source of the coincident sound. For example, a temperature of the medium (e.g., received from temperature sensors) that the knock sensors 23 are coupled to on the reciprocating device may be utilized. Also, the known speed of sound in the medium may also be utilized. In certain embodiments, 2D sound triangulation may be utilized to locate the source of the coincident noise. In 2D sound triangulation, noise signals received from an array of knock sensors 23 disposed along a single plane of (e.g., through) the reciprocating device may be utilized. In certain embodiments, 3D sound triangulation may be utilized may be utilized to locate the source of the coincident noise. In 3D sound triangulation, noise signals received from more than one array of knock sensors 23 disposed along multiple planes (e.g., 2 or more planes) of (e.g., through) the reciprocating device may be utilized.

The process 76 yet further includes the ECU 25 storing and/or logging the gathered noise data (e.g., raw, processed, and/or analyzed) and/or analyzed signals (e.g., including the location and/or time of the coincident noise as well as associated data (e.g., temperature, sampling rate, etc.)) locally (e.g., memory 74) or transmitting the data to a remote device for storage and analysis (future and/or real-time analysis) (block 90). Also, the process 76 includes providing the location of the coincident noise within the reciprocating device (block 92). In certain embodiments, a potential cause or causes (e.g., part of reciprocating device, potential condition of part, etc.) may be provided given the location of the coincident noise and/or the noise signature. The location of the coincident noise and/or potential cause or causes may be provided on a display associated with the ECU 25 and/or a display on a remote device in communication with the ECU 25.

Figure 4:
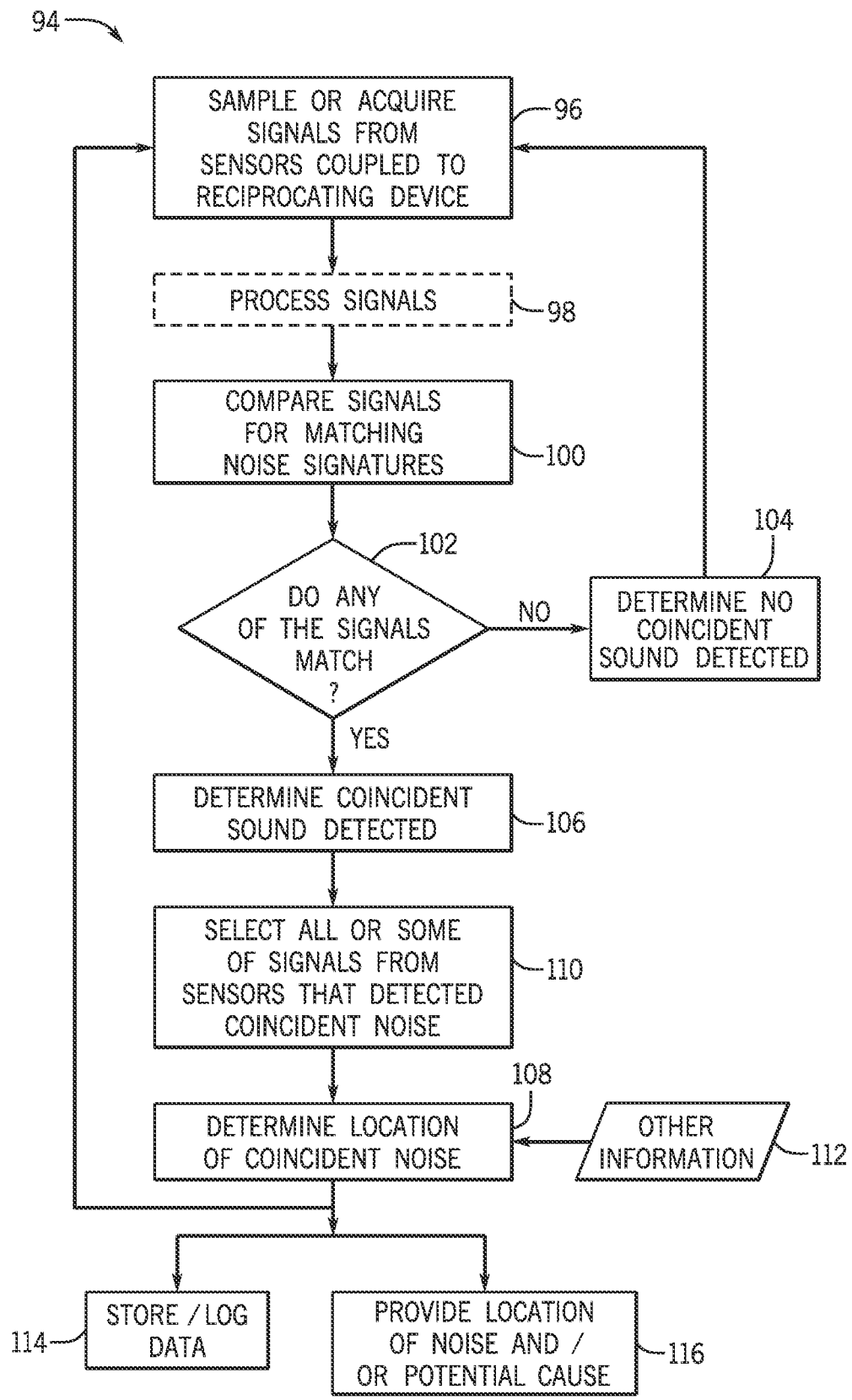
FIG. 4 is a flow chart illustrating another embodiment of a process for detecting and locating coincident noises in a reciprocating device in accordance with aspects of the present disclosure.

FIG. 4 is a flow chart illustrating another embodiment of a process 94 for detecting and locating coincident noises in a reciprocating device (e.g., the engine 10 in FIG. 2, compressor, etc.). The process 94 may be implemented as computer instructions or executable code stored in the memory 74 and executable by the processor 72 of the ECU 25 or any reciprocating device controller. The process 94 includes receiving, sampling, or acquiring signals (e.g., noise signals) or data from sensors coupled to the reciprocating device (block 96). The sensors may include the knock sensors 23 and/or the crankshaft sensors 66. The sensors may be sampled at a same rate and taken at a same time. The noise signals may include a noise signature of the reciprocating device (e.g., engine 10) detected at a respective knock sensor 23. In certain embodiments, the noise signals may be acquired from the knock sensors 23 arrayed along a single plane (see FIG. 5) or multiple planes (see FIG. 6). In certain embodiments, the sensors may include one or more temperature sensors or transducers that detect a temperature of a medium (e.g., cast iron or other material or combination of materials) that the knock sensors 23 are coupled to on the reciprocating device. Thus, the one or more temperature sensors may provide a temperature signal that represents the temperature of the medium, such as a global temperature or a temperature gradient at the location the knock sensors 23 is coupled to the medium. In certain embodiments, the process 94 includes processing the received signals (e.g., noise signals) or data (block 98) as described above in block 80 of the process 76.

The process 94 further includes comparing the signals (e.g., noise signals) from different knock sensors 23 for matching noise signatures corresponding to a coincident noise (block 100). A number of techniques may be utilized for detecting the coincident noise such as joint time frequency analysis and/or applying an ADSR envelope as described above. The process 94 includes determining if any of the noise signatures of the compared noise signals match (block 102). If no noise signatures of the compared noise match, it is determined no coincident noise is detected (block 104) and the process 94 continues with receiving and analyzing signals from the sensors (blocks 78, 82). If noise signatures of some of the compared noise signals match, it is determined that a coincident sound is detected (block 106) and the process 94 proceeds with determining a location of the coincident noise (block 108). In certain embodiments, prior to determining the location of the coincident noise, the process 94 may include selecting all or at least a couple of noise signals from those knock sensors 23 that detected the coincident noise for utilization in locating the coincident noise (block 110).

Acoustic source localization (e.g., sound triangulation) may be utilized to determine the location of the coincident noise in the reciprocating device (block 108) in process 94. Based on the known location of the knock sensors 23 that detected the coincident noise and given that the knock sensors 23 are sampled at the same rate and taking data at the same time, the source of the detected coincident sound may be detected. Besides the location of the knock sensors 23 and the sampling rate of the knock sensors 23, other information 112 may also be utilized in locating the source of the coincident sound. For example, a temperature of the medium (e.g., received from temperature sensors) that the knock sensors 23 are coupled to on the reciprocating device may be utilized. Also, the known speed of sound in the medium may also be utilized. In certain embodiments, 2D sound triangulation may be utilized to locate the source of the coincident noise. In 2D sound triangulation, noise signals received from an array of knock sensors 23 disposed along a single plane of (e.g., through) the reciprocating device may be utilized (see FIG. 5). In certain embodiments, 3D sound triangulation may be utilized may be utilized to locate the source of the coincident noise. In 3D sound triangulation, noise signals received from more than one array of knock sensors 23 disposed along multiple planes (e.g., 2 or more planes) of (e.g., through) the reciprocating device may be utilized (see FIG. 6).

The process 94 yet further includes the ECU 25 storing and/or logging the gathered noise data (e.g., raw, processed, and/or analyzed) and/or analyzed signals (e.g., including the location and/or time of the coincident noise as well as associated data (e.g., temperature, sampling rate, etc.)) locally (e.g., memory 74) or transmitting the data to a remote device for storage and analysis (future and/or real-time analysis) (block 114). Also, the process 94 includes providing the location of the coincident noise within the reciprocating device (block 116). In certain embodiments, a potential cause or causes (e.g., part of reciprocating device, potential condition of part, etc.) may be provided given the location of the coincident noise and/or the noise signature. The location of the coincident noise and/or potential cause or causes may be provided on a display associated with the ECU 25 and/or a display on a remote device in communication with the ECU 25.

Figure 5:
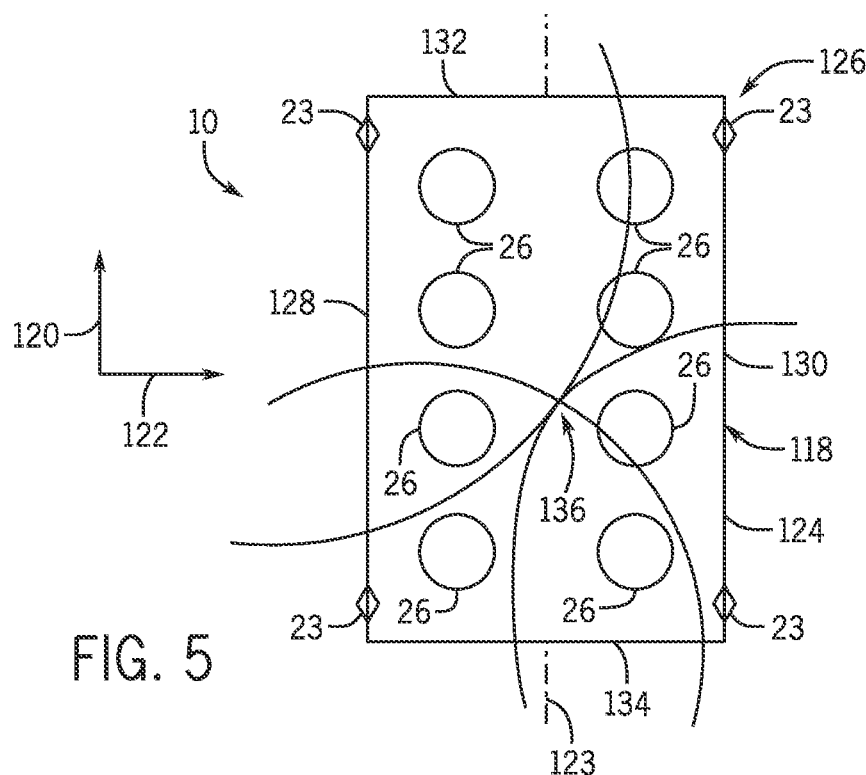
FIG. 5 is a schematic diagram of an embodiment of an array of knock sensors disposed along a single plane of a combustion engine in accordance with aspects of the present disclosure.

FIG. 5 is a schematic diagram (e.g., of a top or bottom view) of an embodiment of an array of knock sensors 23 disposed along a single plane 118 (e.g., traversing the engine 10 in directions 120 and 122 relative to a longitudinal axis 123 of the engine 10) through the combustion engine 10. The same schematic diagram may be applicable to other reciprocating devices such as reciprocating compressor. The depicted engine 10 is only for illustrative purposes and does not show all of the components of the engine 10 (e.g., pistons, etc.). The engine 10 includes a plurality of cylinders 26 disposed within an engine block 124. As depicted, the engine 10 includes eight cylinders 26 but the engine 10 may include any number of cylinders 26. The engine 10 includes an array 126 of knock sensors 23 disposed along the plane 118. As depicted, the array 126 includes fours knock sensors 23 but may include any number of knock sensors 23. In certain embodiments, each cylinder 26 may be associated with a respective knock sensor 26. The disposition of the array 126 of knock sensors 23 on the single plane 118 enables 2D sound triangulation to be utilized to detect a coincident noise. The disposition of the knock sensors 23 on a left side 128, a right side 130, a front side 132, and a rear side 134 enables a stereo sound technique to be utilized in detecting the coincident noise. As depicted, intersection point 136 represents the location of a coincident noise detected via sound triangulation utilizing the noise signals from some of the knock sensors 23 disposed along the plane 118 (e.g., knock sensors 23 along left side 128 and knock sensor 23 located on right side 130 near rear side 134).

Figure 6:
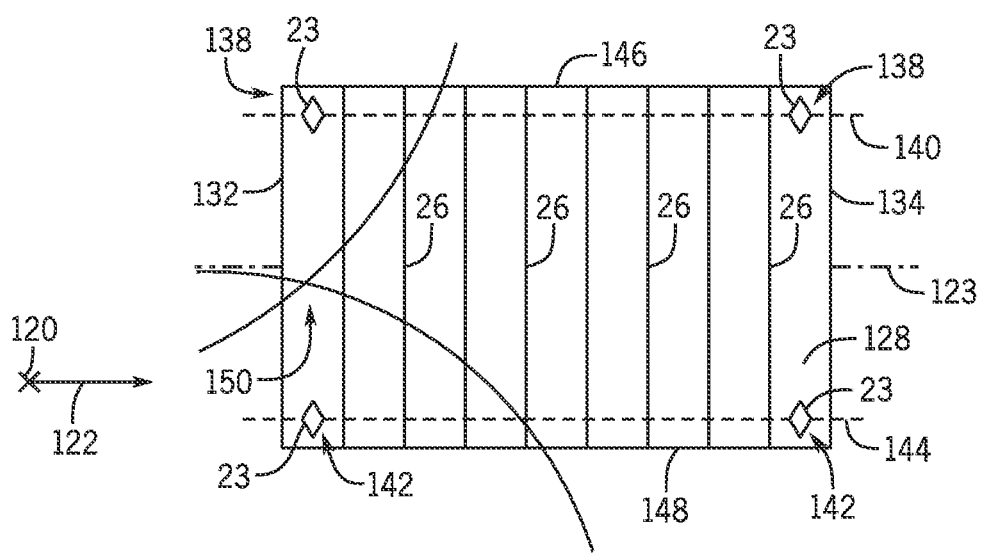
FIG. 6 is a schematic diagram of an embodiment of multiple arrays of knock sensors disposed along multiple planes of a combustion engine in accordance with aspects of the present disclosure.

FIG. 6 is a schematic diagram (e.g., of a side view) of an embodiment of multiple arrays of knock sensors 23 disposed along multiple planes 140, 144 (e.g., traversing the engine 10 in directions 120 and 122 relative to a longitudinal axis 123 of the engine 10) through the combustion engine 10. The same schematic diagram may be applicable to other reciprocating devices such as reciprocating compressor. The depicted engine 10 is only for illustrative purposes and does not show all of the components of the engine 10 (e.g., pistons, etc.). The engine 10 includes a plurality of cylinders 26 disposed within an engine block 124. As depicted, the engine 10 includes fours cylinders 26 but the engine 10 may include any number of cylinders 26. The engine 10 includes an array 138 of knock sensors 23 disposed along the plane 140. As depicted, the array 138 includes two knock sensors 23 disposed along the side 128 along the plane 140 but may include any number of knock sensors 23 along the plane 140 (including knock sensors 23 disposed on the opposite side from side 128 such as illustrated in FIG. 5). As depicted, the array 142 includes two knock sensors 23 disposed along the side 128 along the plane 144 but may include any number of knock sensors 23 along the plane 144 (including knock sensors 23 disposed on the opposite side from side 128 such as illustrated in FIG. 5). The engine 10 may include any number of arrays of knock sensors 23 arranged along any number of planes through the engine 10. In certain embodiments, each cylinder 26 may be associated with a respective knock sensor 26. The disposition of the arrays 138, 142 of knock sensors 23 on multiple planes 140, 144 enables 3D sound triangulation to be utilized to detect a coincident noise. The disposition of the knock sensors 23 on a left side 128, a right side 130 (not shown), a front side 132, a rear side 134, adjacent a top side 146, and adjacent a bottom side 148 enables a stereo sound technique to be utilized in detecting the coincident noise. As depicted, intersection point 150 represents the location of a coincident noise detected via sound triangulation utilizing the noise signals from some of the knock sensors 23 disposed along multiple planes 140, 144 (e.g., at least one knock sensor 23 disposed along plane 140 and at least one knock sensor 23 disposed along plane 144).

Technical effects of the disclosed embodiments include utilizing signals (e.g., noise signals) from knock sensors 23 along with the location of the knock sensors 23 and other information to locate coincident noises detected by the knock sensors 23. For example, sound triangulation may be utilized to provide a location of the coincident noise. By locating the noise source of the coincident noise, a better diagnosis of the exact source and potential cause of the noise (e.g., mechanical failure and/or change in condition) may be determined. Also, locating the noise source may provide better advanced prognostics.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a controller configured to receive noise signals acquired by at least two knock sensors of a plurality of knock sensors coupled to a reciprocating device at different locations associated with different cylinders of the reciprocating device, each noise signal representing a noise signature of the reciprocating device detected at a respective knock sensor, to detect a presence of a coincident noise based at least on the received noise signals, and to determine, when the coincident noise is present, a location of the coincident noise within the reciprocating device based at least on the received noise signals.

2. The system of claim 1, wherein the controller is configured to utilize sound triangulation to determine the location of the coincident noise within the reciprocating device.

3. The system of claim 2, wherein the at least two knock sensors of the plurality of knock sensors are located on a same plane through the reciprocating device, and the controller is configured to utilize two-dimensional sound triangulation to determine the location of the coincident noise within the reciprocating device.

4. The system of claim 2, wherein the at least two knock sensors of the plurality of knock sensors are located on different planes through the reciprocating device, and the controller is configured to utilize three-dimensional sound triangulation to determine the location of the coincident noise within the reciprocating device.

5. The system of claim 2, wherein the controller is configured to receive a temperature signal representing a temperature of a medium from at least one temperature sensor coupled to the medium that the plurality of knock sensors is coupled to within the reciprocating device, and to determine the location of the coincident noise within the reciprocating device based at least on the temperature signal and the received noise signals.

6. The system of claim 3, wherein the controller is configured to determine the location of the coincident noise within the reciprocating device based at least on the temperature signal, the received noise signals, and a speed of sound in the medium.

7. The system of claim 1, wherein the controller is configured to receive noise signals acquired by the plurality of knock sensors and to compare respective noise signatures received from plurality of knock sensors for matching noise signatures to detect the coincident noise.

8. The system of claim 7, wherein the controller is configured select the at least two knock sensors from the plurality of knock sensors to determine the location of the coincident noise within the reciprocating device based on matching noise signatures within the noise signals received from the at least two knock sensors.

9. The system of claim 7, wherein the controller is configured to utilize joint time frequency analysis on the received noise signals acquired by the plurality of knock sensors to detect the coincident noise.

10. The system of claim 7, wherein the controller is configure to utilize an attack, decay, sustain, release (ADSR) envelope on the received noise signals acquired by the plurality of knock sensors to detect the coincident noise.

11. A method of locating a coincident noise within a reciprocating device, comprising:
utilizing a reciprocating device controller for:
receiving noise signals from a plurality of knock sensors coupled to the reciprocating device at different locations associated with different cylinders of the reciprocating device, wherein each noise signal represents a noise signature of the reciprocating device detected at a respective knock sensor;
analyzing the noise signals to detect a presence of the coincident noise within the reciprocating device; and
determining, when the coincident noise is present, a location of the coincident noise within the reciprocating device based at least on the received noise signals from at least two knock sensors of the plurality of knock sensors.

12. The method of claim 11, wherein analyzing the noise signals to detect the coincident noise comprises comparing the sampled noise signals from different knock sensors for matching noise signatures to detect the coincident noise and to identify which knock sensors of the plurality of knock sensors detected the coincident noise.

13. The method of claim 12, comprising selecting the received noise signals from the at least two knock sensors from among the knock sensors that detected the coincident noise for determining the location of the coincident noise.

14. The method of claim 11, wherein determining the location of the coincident noise comprises utilizing sound triangulation to determine the location of the coincident noise within the reciprocating device.

15. The method of claim 14, wherein the at least two knock sensors of the plurality of knock sensors are located on a sample plane through the reciprocating device, and utilizing sound triangulation comprises utilizing two-dimensional sound triangulation.

16. The method of claim 14, wherein the at least two knock sensors of the plurality of knock sensors are located on different planes through the reciprocating device, and utilizing sound triangulation comprises utilizing three-dimensional sound triangulation.

17. The method of claim 14, comprising receiving a temperature signal representative of a temperature of the medium that the at least two knock sensors of the plurality of knock sensors are coupled to within the reciprocating device, and determining the location of the coincident noise within the reciprocating device based at least on the received noise signals from at least two knock sensors and the temperature of the medium.

18. The method of claim 17, comprising determining the location of the coincident noise within the reciprocating device based at least on the received noise signals from at least two knock sensors, the temperature of the medium, and a speed of sound in the medium.

19. A method of detecting a coincident noise within a combustion engine, comprising:
utilizing an engine controller for:
receiving noise signals from a plurality of knock sensors coupled to the combustion engine at different locations associated with different cylinders of the combustion engine, wherein each noise signal represents a noise signature of the combustion engine detected at a respective knock sensor; and
comparing the received noise signals from different knock sensors of the plurality of knock sensors for matching noise signatures to detect a presence of the coincident noise and to identify which knock sensors of the plurality of knock sensors detected the coincident noise.

20. The method of claim 19, comprising determining a location of the coincident noise within the combustion engine via sound triangulation based at least on the received noise signals from at least two knock sensors of the knock sensors that detected the coincident noise.

* * * * *